United States Patent
Sandberg et al.

(10) Patent No.: US 10,050,734 B2
(45) Date of Patent: Aug. 14, 2018

(54) NETWORK NODE AND METHOD FOR ENABLING INTERFERENCE ALIGNMENT OF TRANSMISSIONS TO USER EQUIPMENTS

(71) Applicant: Telefonaktiebolaget LM Ericsson (publ), Stockholm (SE)

(72) Inventors: Sara Sandberg, Luleå (SE); Yuri C. B. Silva, Fortaleza-CE (BR); Paulo G. Normando, Fortaleza-CE (BR); Arne Simonsson, Gammelstad (SE); Elvis M. G. Stancanelli, Quixada (BR); Niklas Wernersson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 118 days.

(21) Appl. No.: 15/101,579

(22) PCT Filed: Dec. 18, 2013

(86) PCT No.: PCT/EP2013/077149
§ 371 (c)(1),
(2) Date: Jun. 3, 2016

(87) PCT Pub. No.: WO2015/090382
PCT Pub. Date: Jun. 25, 2015

(65) Prior Publication Data
US 2016/0315726 A1 Oct. 27, 2016

(51) Int. Cl.
*H04J 11/00* (2006.01)
*H04W 72/12* (2009.01)
(Continued)

(52) U.S. Cl.
CPC .......... *H04J 11/0026* (2013.01); *H04B 7/024* (2013.01); *H04W 24/10* (2013.01); *H04W 72/121* (2013.01); *H04W 72/1231* (2013.01)

(58) Field of Classification Search
CPC ............................ H04J 11/0026; H04B 7/024
(Continued)

(56) References Cited

U.S. PATENT DOCUMENTS 8,588,801 B2 * 11/2013 Gorokhov .............. H04B 7/024
370/252
2010/0054143 A1 * 3/2010 Kokku ................... H04B 7/022
370/252
(Continued)

FOREIGN PATENT DOCUMENTS

WO 2011022733 A2 2/2011
WO 2013093341 A2 6/2013

OTHER PUBLICATIONS

Peters, Steven, W., et al., "Orthogonalization to Reduce Overhead in MIMO Interference Channels," Proceedings of the International Zurich Seminar on Communications (IZS), Mar. 3-5, 2010, Zurich, Switzerland, IEEE, 5 pages.
(Continued)

*Primary Examiner* — Mang Yeung
*Assistant Examiner* — Peter G Solinsky
(74) *Attorney, Agent, or Firm* — Sage Patent Group

(57) ABSTRACT

A method performed by a network node for enabling Interference Alignment, IA, of transmissions to user equipments is provided. The network node receives signal strength values associated with more than one network node for the user equipments, wherein each signal strength value is associated with one network node. Then, the network node schedules a first group of the user equipments on radio transmission resources that are orthogonal to radio transmission resources of at least one other group of the user equipments when an IA gain value for each user equipment in the first group passes a threshold level. The IA gain value is determined by the network node based on the received signal strength values. The network node may then enable
(Continued)

IA of transmissions to the scheduled first group of user equipments from at least two network nodes capable of performing IA of transmissions.

17 Claims, 3 Drawing Sheets

(51) Int. Cl.
*H04B 7/024* (2017.01)
*H04W 24/10* (2009.01)

(58) Field of Classification Search
USPC .......................................................... 370/329
See application file for complete search history.

(56) References Cited

U.S. PATENT DOCUMENTS

| | | | |
|---|---|---|---|
| 2010/0227635 A1* | 9/2010 | Kim | H04W 72/048 455/501 |
| 2010/0265813 A1 | 10/2010 | Pereira et al. | |
| 2012/0315935 A1* | 12/2012 | Wang Helmersson | H04W 16/18 455/501 |
| 2013/0344908 A1* | 12/2013 | Hwang | H04W 16/14 455/501 |
| 2014/0328260 A1* | 11/2014 | Papasakellariou | H04W 72/1289 370/329 |
| 2014/0349581 A1* | 11/2014 | Oh | H04L 25/03343 455/63.1 |
| 2015/0131751 A1* | 5/2015 | Bayesteh | H04B 7/0413 375/267 |
| 2016/0308590 A1* | 10/2016 | Wang | H04L 25/03343 |
| 2017/0208613 A1* | 7/2017 | Nam | H04W 72/1226 |

OTHER PUBLICATIONS

Zetterberg, Per, et al., "An Experimental Investigation of SIMO, MIMO, Interference-Alignment (IA) and Coordinated Multi-Point (CoMP)," 19th International Conference on Systems, Signals and Image Processing (IWSSIP), Apr. 11-13, 2012, Vienna, Austria, IEEE, 7 pages.

International Search Report and Written Opinion for International Patent Application No. PCT/EP2013/077149, dated Sep. 2, 2014, 14 pages.

* cited by examiner

NETWORK NODE AND METHOD FOR ENABLING INTERFERENCE ALIGNMENT OF TRANSMISSIONS TO USER EQUIPMENTS

This application is a 35 U.S.C. § 371 national phase filing of International Application No. PCT/EP2013/077149, filed Dec. 18, 2013, the disclosure of which is incorporated herein by reference in its entirety.

TECHNICAL FIELD

Embodiments herein relate to transmissions in a wireless telecommunications network. In particular, embodiments herein relate to a network node and a method enabling interference alignment of transmission to user equipments in a wireless telecommunications network.

BACKGROUND

In a wireless communications network, co-channel interference is one of the main factors limiting the capacity of the network. Co-channel interference is caused when the same frequency resources are used at the same time by two different transmitters. This may be compared to, for example, adjacent channel interference which is caused when leakage occurs from one frequency to another frequency due to imperfections in the receivers and transmitters. There exist several approaches for dealing with the co-channel interference in a multi-user scenario today. These approaches require different levels of coordination among the transmitters.

Interference alignment, IA, is one such technique that may be used to mitigate the co-channel interference between transmitter-receiver pairs; provided, however, that there are enough Degrees of Freedom, DoF, available. One example of when IA may normally be applied is when using a Multiple-Input Multiple-Output Interference Channel, MIMO-IC, wherein multiple transmitters simultaneously transmit data to their respective receivers.

IA involves multiple transmitters that attempts to align the caused interference to unintended receivers within a minimum-dimension subspace, so that at each receiver the remaining dimensions may be used for interference-free communication. This allows each receiver to eliminate all the interference by simply canceling everything that falls into this subspace. This is a rather general idea, in the sense that the radio signals may be aligned in any given dimension, such as time, frequency, or space. There are also several possible ways to specify and implement IA algorithms depending on the cost function to be optimized and on the level of coordination between network nodes.

In a conventional wireless communications network, only the intra-cell interference may sometimes be mitigated. Thus, when there exists coordination between different cells, such as, e.g. in a Coordinated Multi-Point, CoMP, network, the interference between cells, i.e. inter-cell interference, may be cancelled by using other techniques, such as, e.g. joint precoding. Joint precoding however requires a tight coordination between the network nodes and that the data streams are shared among the transmitters. However, when it is not possible to perform a joint precoding transmission, such as, e.g. in the case of loose coordination between the network nodes, then IA may be a suitable technique for cancelling the co-channel interference.

Also, with regard to interference limited scenarios, IA is especially good at low Signal-to-Interference-plus-Noise Ratios, SINRs, as it tends to be more robust than other interference cancellation techniques.

However, depending on the network configuration, which may be determined by e.g. the number of antenna elements both at the transmitter and at the receiver side, the number of simultaneous transmitter-receiver pairs, as well as, the number of data streams communicated between each transmitter-receiver pair, it may be impossible sometimes to completely cancel out the co-channel interference using IA. This is because the feasibility of using IA for a particular network configuration is directly related to solving a system of equations. The number of dimensions required at each network node may however easily become impracticable as the number of simultaneous users increases, that is, if too many simultaneous transmitter-receiver pairs are considered, then an exceedingly large number of antennas might be required at each network node.

Furthermore, given the IA feasibility conditions and assuming a certain network configuration, fewer data streams are typically transmitted when using IA coordinated transmissions as compared to transmissions without coordination. Another limitation of IA is that the technique achieves good results mainly for a high Signal-to-Noise Ratio, SNR, regime, where gains of the DoF affect the performance more significantly.

However, more importantly, it has been noted that using IA for interference mitigation may potentially result in lower link level throughputs, at least for some radio links in a wireless communications network.

SUMMARY

It is an object of embodiments herein to improve the use of IA for interference mitigation in a wireless communications network.

According to a first aspect of embodiments herein, the object is achieved by a method performed by a network node for enabling Interference Alignment, IA, of transmissions to user equipments. The network node and the user equipments are configured to be in a wireless telecommunications network. The network node receives signal strength values associated with more than one network node for the user equipments, wherein each signal strength value is associated with one network node. The network node then schedules a first group of the user equipments on radio transmission resources that are orthogonal to radio transmission resources of at least one other group of the user equipments when an IA gain value for each user equipment in the first group passes a threshold level. The IA gain value is determined by the network node based on the received signal strength values. Then, the network node enables the IA of transmissions to the scheduled first group of user equipments from at least two network nodes capable of performing IA of transmissions.

According to a second aspect of embodiments herein, the object is achieved by a network node for enabling IA of transmissions to user equipments. The network node and the user equipments are configured to be in a wireless telecommunications network. The network node is further configured to receive signal strength values associated with more than one network node for the user equipments, wherein each signal strength value is associated with one network node. Also, the network node is further configured to schedule a first group of the user equipments on radio transmission resources that are orthogonal to radio transmission resources of at least one other group of the user equipments when an IA gain value for each user equipment in the first group passes a threshold level, which IA gain value is determined based on the received signal strength values, and enable IA of transmissions to the scheduled first group of user equipments at least two network nodes capable of performing IA of transmissions.

By using an IA gain value to indicate how much each individual UE would benefit from IA and then enable IA of transmissions only to those scheduled UEs for which a high enough IA gain value have been indicated, the network node capable of avoiding throughput losses in the wireless communications network that are associated with applying interference mitigation using IA towards all scheduled UEs.

Hence, the use of IA for interference mitigation in a wireless communications network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
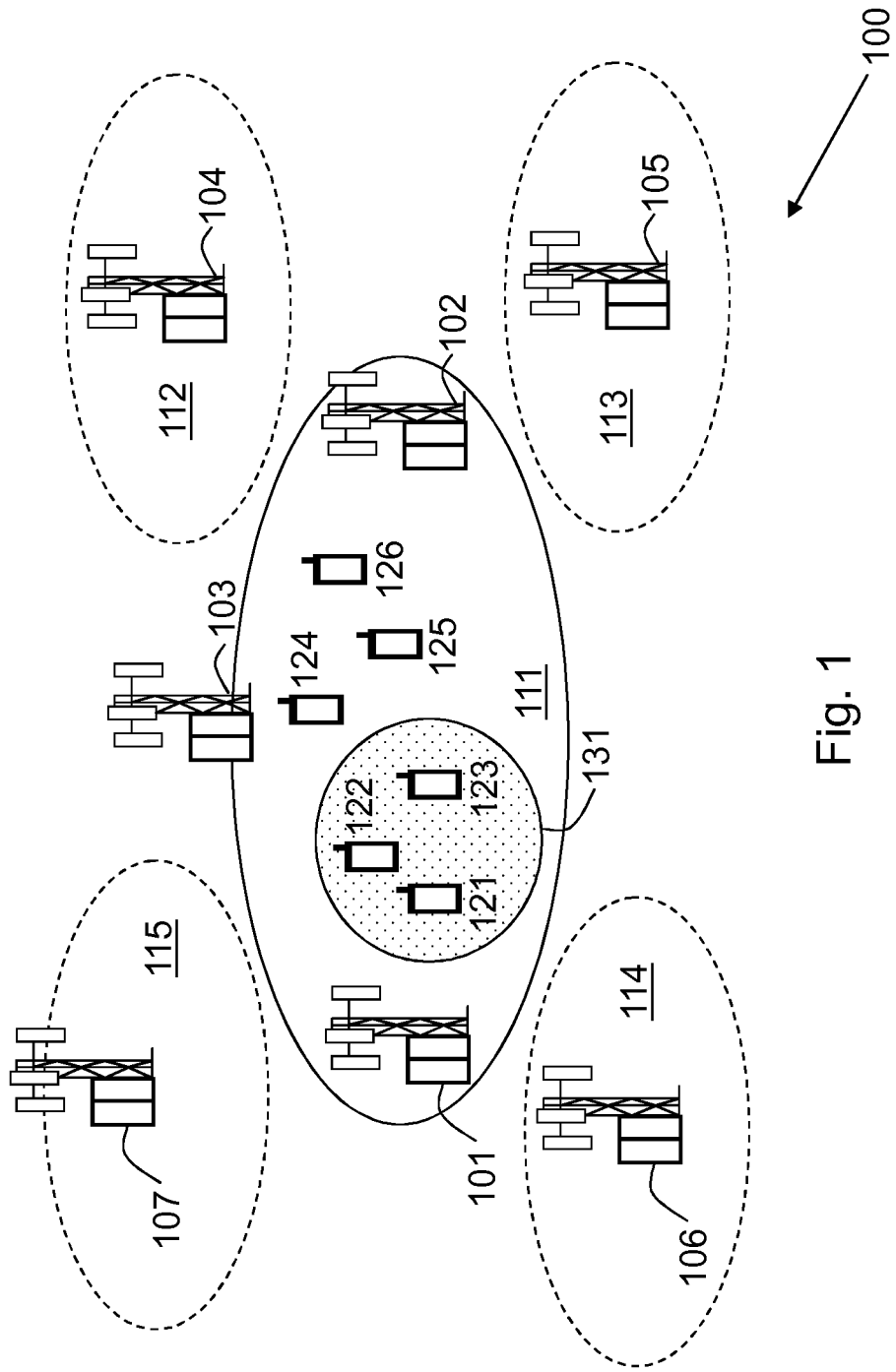
FIG. 1 is a schematic block diagram illustrating user equipments and embodiments of network nodes in a wireless communications network.

The figures are schematic and simplified for clarity, and they merely show details which are essential to the understanding of the embodiments presented herein, while other details have been left out. Throughout, the same reference numerals are used for identical or corresponding parts or steps.

It may also be noted that the term user equipment, or UE, includes, but is not limited to, a mobile terminal, a mobile phone, smart phone, a personal digital assistant, tablet computer, a mobile station, a portable computer equipped with suitable transceivers, a stationary computer equipped with suitable transceivers and the like. A user equipment may also refer to a Machine-to-Machine, M2M, communication device that serves as a data communication modem or is built into equipment communicating data with a server without human interaction.

FIG. 1 shows an example of a wireless communication network 100 in which embodiments herein may be implemented. The wireless communications network 100 may be a wireless communication system, such as, an LTE, WCDMA, GSM network, or any other 3GPP cellular network or system. The wireless communications system 100 comprises the network nodes 101-107.

Each of the network nodes 101-107 may e.g. be an eNB, eNodeB, or a Home Node B, a Home eNode B, femto Base Station (BS), pico BS or any other network unit capable to serve a user equipment or a machine type communication device in the wireless communications system 100. The network node may also be e.g. a base station controller, a network controller, a relay node, a repeater, an access point, a radio access point, a Remote Radio Unit (RRU) or a Remote Radio Head (RRH). Furthermore, the network nodes 101-107 each comprise one or more antennas for wireless radio communication with user equipments located within their coverage range; that is, each of the network nodes 101-107 may use one or more of its antennas to provide radio coverage within its cells.

In this example, the network nodes 101, 102, 103 are each configured to provide wireless radio coverage to user equipments in each of its cells (not shown). The network nodes 101, 102, 103 are connected and configured to communicate with each other, e.g. over an X2 connection. The network nodes 101, 102, 103 are also configured to provide coordinated transmissions to user equipments 121-126 located within a specific coordinated area 111, hereinafter referred to as coordinated area 111. The network nodes 101, 102, 103 corresponding to the coordinated area 111 may be referred to as a Coordinated Multi Point, CoMP, cluster. The coordinated area 111 may comprise any number of coordinated cells or sectors of the network nodes 101, 102, 103. Coordinated transmissions may be performed by the network nodes 101-103 to increase the system throughput. To increase system throughput, the interference from the cells of the network nodes 101, 102, 103 being a part of the coordination area 111 affecting transmissions to the user equipments 121-126 (i.e. within the coordination area) may be mitigated using IA. Here, in this example, it may be assumed that IA is accomplished along the spatial dimension.

Thus, the network nodes 101-103 are capable of performing interference alignment, IA, of transmissions. In other words, the network nodes 101-103 are capable of performing IA of downlink transmissions to the user equipments 121-126 in the coordination area 111.

It should also be noted that each of the user equipments 121-126 may e.g. be any kind of wireless device such as a mobile phone, a cellular phone, a Personal Digital Assistant (PDA), a smart phone, a tablet, a sensor equipped with a UE, Laptop Mounted Equipment (LME) (e.g. USB), Laptop Embedded Equipment (LEE), Machine Type Communication (MTC) device or Machine to Machine (M2M) device, a UE with D2D capability, Customer Premises Equipment (CPE), etc.

FIG. 1 also shows an example of a first group 131 of user equipments 121-123 of the user equipments 121-126 located within the coordination area 111, which will be referred to below. Furthermore, in this example, the network nodes 104, 105, 106, 107 are configured to provide wireless radio coverage to user equipments in cells 112, 113, 114, 115, respectively. In this example, the network nodes 104-107 are not capable of performing IA of transmissions. In other words, the network nodes 104-107 are not able to perform interference alignment, IA, of downlink transmissions to the user equipments 121-126 in the coordination area 111.

It should also be noted that the network nodes 101-107 may be configured to provide wireless radio coverage to user equipments in further, possibly overlapping cells in the wireless communication network 100, but that these cells have been omitted in FIG. 1 for the sake of illustration and simplicity. Furthermore, although embodiments below are described with reference to the scenario of FIG. 1, this scenario should not be construed as limiting to the embodiments herein, but merely as an example made for illustrative purposes.

As part of developing the embodiments herein, it has been noticed that the user equipments selected for coordinated transmissions are commonly determined based on compatibility metrics traditionally employed by other spatial precoding techniques rather than by IA. Furthermore, in case of using IA for interference mitigation, it is also commonly assumed that all scheduled user equipments are to be served using IA; this, even though IA might not be beneficial for all user equipments.

In accordance with embodiments described herein, this issue is addressed by, instead of applying IA of transmissions to all scheduled user equipments, e.g. all user equipments 121-126 in the cell 111 in FIG. 1, only applying IA of transmissions to the user equipments that will substantially benefit from the reduced co-channel interference, e.g. the user equipments 121-123 in the first group 131 in FIG. 1. This will avoid the loss in throughput noted when applying IA of transmissions to all scheduled user equipments.

Thus, in the embodiments described herein, it is ensured that IA is only employed for user equipments for which the system level gain caused by the reduced co-channel interference is higher than the corresponding link level losses.

Example of embodiments of a method performed by a network node 101 for enabling Interference Alignment, IA, of transmissions to user equipments 121-126, will now be described with reference to the flowchart depicted in FIG. 2. The network node 101 and the user equipments 121-126 are configured to be in a wireless communications network, such as, e.g. the wireless communications network 100 in FIG. 1.

Figure 2:
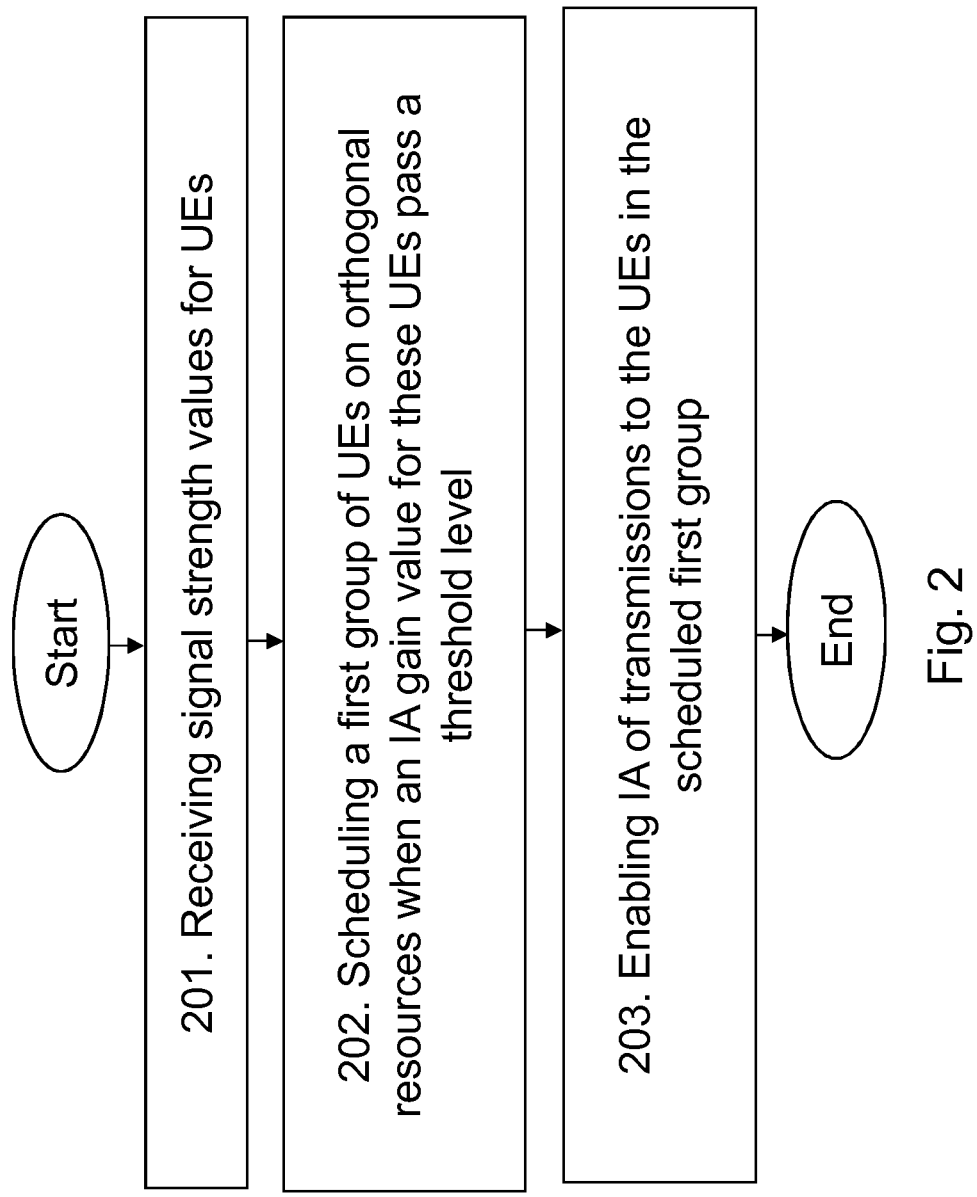
FIG. 2 is a flowchart depicting embodiments of a method in a network node.

FIG. 2 is an illustrated example of actions or operations which may be taken by any one of the network nodes 101, 102, 103. However, it should also be noted that these actions or operations may also be performed by a centralized network node in the wireless communications network 100, such as, e.g. a core network node, a radio network controller, a Radio Resource Management, RRM, server, an Operations Support System, OSS, node or the like. The centralized network node may also be e.g. an eNB controlling distributed Remote Radio Units, RRUs, via e.g. a Common Public Radio Interface, CPRI, or an eNB controlling radio heads over an active Distributed Antenna System, DAS, network. The method may comprise the following actions.

Action 201

In this action, the network node 101 receives signal strength values associated with more than one network node for the user equipments. Here, each signal strength value is associated with one network node. Thus, the path loss between each user equipment 121-126 and each network node 101-107, or any subsets thereof, may be obtained by the network node 101.

It should here be noted that the term 'signal strength value' is a general term and may refer to any signal quality measure related to link performance. It may be obtained by having network nodes transmit Channel State Information Reference Signals, CSI-RS, e.g. as in LTE, which allows the user equipments to measure and estimate a signal strength value which may be fed back from the user equipments to network nodes. This signal strength value may, for example, be CQI or RSRP values. Alternatively, the signal strength value may also be obtained by performing measurements on the uplink, for example, the user equipments may transmit a Sounding Reference Signal, SRS, e.g. as in LTE, whereby the network nodes may receive the SRS and estimate RSRP values based on the SRS signalling.

Hence, in some embodiments, the received signal strength values are Reference Signal Received Power, RSRP, values measured and reported to the network node from the user equipments. As is common for most user equipments, each of the user equipments 121-126 will normally measure and report the received signal strength/power of any transmissions that it receives from any network node from which it is close enough to receive transmissions. These measurement reports are transmitted by the user equipments 121-126 to the network node 101-103 serving the cell in which the user equipment 121-126 is currently located or camping on. Thus, the network node 101 may receive the signal strengths of received transmissions from itself and all interfering network nodes for each of the user equipments located within its cells. Furthermore, by communicating with the other network nodes 102-103, the network node 101 may receive the signal strengths of received transmissions from the serving network node and all interfering network nodes for each of the user equipments 121-126 located in the coordination area 111, i.e. all user equipments 121-126. Here, it may be noted that receiving the signal strength values may also mean obtaining the signal strength values.

In some embodiments, in case a centralized network node is performing the method, the centralized network node may receive the strength/power of received transmissions from the serving network node and all interfering network nodes for each of the user equipments 121-126 located in the coordination area 111 via the network nodes 101-103.

Also, in some embodiments, the received signal strength values are measured on Sounding Reference Signal, SRS, transmissions from the user equipments by at least one network node capable of performing IA of transmissions. In this case, the network nodes 101-107 themselves may measure the path loss between itself and the user equipments 121-126. This may then be reported to the network node 101 or, in some embodiments, to the centralized network node. Thus, in this way, the path loss between each user equipment 121-126 and each network node 101-107 may be obtained by the network node 101.

Action 202

After receiving the signal strength values, the network node 101 schedules a first group of the user equipments on radio transmission resources that are orthogonal to radio transmission resources of at least one other group of the user equipments, e.g. the user equipments 124-126 in FIG. 1. This is performed by the network node 101 when an IA gain value for each of the user equipments in the first group passes a threshold level. The IA gain value is determined by the network node 101 based on the received signal strength values.

In this way, the user equipments 121-126 are grouped into two groups, i.e. a first group of user equipments 121-123 for which the IA gain value has passed a determined threshold level and a second group of user equipments 124-126 for which the IA gain value has not passed a determined threshold level. Then, the user equipments 121-123 in the first group and the user equipments 124-126 in the second group are scheduled on different orthogonal radio transmission resources. This means that interference mitigation using IA may be employed only for those user equipments for which the throughput gain by interference mitigation using IA is higher than the throughput loss. This may be true for the user equipments with IA gain values which have passed the threshold level, i.e. having high IA gain values, such as, the first group 131 of user equipments 121-123.

The user equipments with IA gain values which have not passed the threshold level, i.e. low IA gain values, such as, for the second group of user equipments 124-126, may thus be scheduled separately without employing any interference/coordination mitigation using IA to avoid the throughput losses associated therewith.

Since IA is associated with a certain potential link level throughput loss as well as a significant computational effort, it is advantageous to in this manner only employ IA in cases where the throughput gain by interference mitigation using IA is expected to be higher than the throughput loss. In other words, the network node 101 uses the IA gain value in order to determine which user equipments for which the use of IA is well motivated.

It may also be noted that with the alignment of the interference to a specific subspace through the use of IA, large throughput gains may be achieved. This, however, comes at the costs of potentially reduced signal strength/power, which may cause a low Signal-to-Noise Ratio, SNR, even if the interference is avoided by using IA, and computational complexity. Since at least two transmitting antennas are needed for the alignment of the interference, the number of data streams that may be transmitted to each scheduled user equipment is less when using IA than for a transmission without interference mitigation/coordination. This may reduce the throughput in good signalling conditions. Thus, the aim of the embodiments herein is to estimate, through the IA gain value, when different user equipments benefit from using IA, that is, when the gains are larger than the losses.

In some embodiments, the network node 101 may determine the IA gain value, for each user equipment, based on a first geometry value first geometry value determined based on the received signal strength values for a user equipment that is associated with network nodes 102-107 which are both capable and not capable of performing IA of transmissions together with the network node 101, and a second geometry value determined based on the received signal strength values for a user equipment that is associated with network nodes 104-107 which are not capable of performing IA of transmissions together with the network node 101. This provides for a simple and conservative way of estimating the IA gain, since the first and second geometry values will not change as long as the received signal strengths does not change.

Hereinafter, the IA gain value may also be referred to as a geometry gain, the first geometry value may be referred to as geometry and the second geometry value may be referred to as CoMP geometry.

The first geometry value or geometry of any user equipment i may be given by Eq. 1:

$$\text{geometry}_i = \frac{p_{i,j(i)}^2}{\sum_{k \in \{k:\ k \neq j(i)\}} p_{i,k}^2 + \sigma_n^2} \quad \text{(Eq. 1)}$$

wherein $p_{i,j}^2$ is the received signal strength/power for the user equipment i transmitted from cell j;

j(i) is a function which will give the serving cell j for the user equipment UE i; and $\sigma_n$ is the noise standard deviation.

In Eq. 1, it is assumed that the variable k is a natural number which runs over all the indexes corresponding to all, or potentially a subset of, the non-serving cells for the user equipment i in the network. From Eq. 1 above, it can be seen that the summation in the denominator adds up all potential interference from all non-serving cells within the network for the user equipment i; together with the noise.

For example, in the scenario of FIG. 1 and assuming that the user equipment 121 is served by the network node 101, the denominator in Eq. 1 will add up all potential inference experienced by the user equipment 121 from all non-serving cells of the network nodes 102-107 in the wireless communications network 100.

In this way, the first geometry value or geometry of each of the user equipments 121-126 may be determined based on the received signal strength values that are associated with both network nodes 102-103 capable of performing IA of transmissions to the user equipments 121-126 together with the network node 101, and network nodes 104-107 not capable of performing IA of transmissions to the user equipments 121-126 together with the network node 101.

With a similar notation, the second geometry value or CoMP geometry of any user equipment i may be given by Eq. 2:

$$\text{comp\_geometry}_i = \frac{p_{i,j(i)}^2}{\sum_{k \in \{k:\ c(k) \neq c(j(i))\}} p_{i,k}^2 + \alpha \sum_{k \in \{k:\ k \neq j(i) \wedge c(k) = c(j(i))\}} p_{i,k}^2 + \sigma_n^2} \quad \text{(Eq. 2)}$$

wherein c(j) provides the network node 101 with the CoMP cluster ID to which cell j belongs;

0≤α≤1 is a factor that specifies the interference leakage from transmissions to user equipments within the CoMP cluster wherein the interference may be mitigated by using IA; and $\sigma_n$ is the noise standard deviation.

From Eq. 2 above, it can be seen that the denominator corresponds to the sum of all potential interference from non-serving cells in the network outside of the CoMP cluster for the user equipment i, i.e. out-of-cluster interference, plus an interference leakage factor times the sum of all potential interference from non-serving cells in the network within the CoMP cluster for the user equipment i, i.e. intra-cluster interference; together with the noise.

For example, in the scenario of FIG. 1 and assuming that the user equipment 121 is served by the network node 101, the denominator in Eq. 1 will add up all potential inference experienced by the user equipments 121 from the non-serving cells 112-115 of the network nodes 104-107 in the wireless communications network 100, and the potential inference experienced by the user equipments 121 from the non-serving cells of the network nodes 102-103 in the wireless communications network 100 that forms part of the coordinated area 111 (depending on the interference leakage factor α).

In this way, the second geometry value of each of the user equipments 121-126 may be determined based on the received signal strength values that are associated with network nodes 104-107 not capable of performing IA of transmissions to the user equipments 121-126. This is because the interference caused by the network nodes 102-103 capable of performing IA of transmissions to the user equipments 121-126, i.e. the network nodes 102-103 in the wireless communications network 100, may be mitigated by using IA (in this case, α=0). However, as seen above, the second geometry value may further be based on an interference leakage factor, α, and received signal strength values for the user equipment that is associated with network nodes 102-103 which are capable of performing IA of transmissions together with the network node 101 (in this case, α>0).

In other words, the second geometry value or CoMP geometry may, in some embodiments, be seen as the geometry for user i given that the interference from non-serving cells within its CoMP cluster was mitigated by some interference mitigation method, e.g. IA.

Furthermore, in case of only having access to a subset of the values $p_{i,j}^2$ when calculating Eq. 1 and 2, estimated values for the missing $p_{i,j}^2$-values may be used. These values may be estimated in advance, or may constitute values from previous measurements. Alternatively, these values may be set to $p_{i,j}^2=0$ for missing values.

Thus, with these definitions of the first and second geometry values, the IA gain value or geometry gain value, for any user equipment i may be given by Eq. 3:

$$\text{geometry\_gain}_i = \frac{\text{comp\_geometry}_i}{\text{geometry}_i} \quad (Eq. 3)$$

which may be seen as a measurement of an estimated SINR improvement achieved by mitigating the interference from the non-serving cells within the CoMP cluster, e.g. from the cells of the network nodes 102-103 for the user equipment 121 when the user equipment 121 is assumed to be served by the network node 101 in FIG. 1.

This IA gain or geometry gain value can be expected to correspond well with the actual IA gain. Therefore, this IA gain or geometry gain value may be used as an estimated for the IA gain. Hence, the IA gain may be estimated for user equipment i by the geometry_gain, in Eq 3.

It may be noted that since the IA gain value for each user equipment may be estimated using RSRP values, updates of the IA gain values of the user equipments may be performed on a rather slow basis compared to the scheduling.

Furthermore, it should be noted that knowledge about cells that are not expected to transmit data in some Time Transmission Intervals, TTIs, are easy to incorporate into the geometry equations (Eq. 1-3) above, e.g. by setting $p_{i,j}^2=0$ for this cell. For example, this may be the case when there are currently no user equipments served by a given network node. Another example may be when a network node is in sleep mode. Hence, such aspects may refine determining of IA gain or geometry gain value to be even more suitable for use in deriving a scheduling decision for the TTIs.

Alternatively, in some embodiments, the IA gain value for each user equipment may be determined by the network node 101 based on a first Signal to Interference plus Noise Ratio, SINR, value determined based on the received signal strength values for a user equipment that is associated with network nodes 102-107 which are both capable and not capable of performing IA of transmissions together with the network node 101, and a second SINR value determined based on the received signal strength values for a user equipment that is associated with network nodes 104-107 which are not capable of performing IA of transmissions together with the network node 101.

In this way, the actual scheduling of the network nodes 101-107 is taken into account. This in contrast to when determining and using the first and second geometry values as above, in which case, all network nodes 101-107 are taken into account even if not transmitting any data. Eq. 1-3 may be modified to correspond to the determined SINR values.

In some embodiments, the second SINR value may further be based on an interference leakage factor α and received signal strength values for the user equipment that is associated with network nodes 102-103 which are capable of performing IA of transmissions together with the network node 101.

In some embodiments, the network node 101 may determine the IA gain value for each user equipment 121-126 further based on estimated bit rate values. Here, a first bit rate value may be estimated using the first geometry or SINR value and a second estimated bit rate value may be estimated using the second geometry or SINR value. The first and second estimated bit rates may then be used by the network node 101 to estimate a throughput gain, which throughput gain may be used as the IA gain or geometry gain value.

Determining the IA gain value by estimating a throughput gain advantageously provides a more accurate measurement in the sense that it may more directly map to the desired objective in some cases, e.g. to maximize throughput. The network node 101 may thus group and schedule the user equipments 121-126 into an IA group, i.e. the first group of user equipments 121-123, and a non-IA group, i.e. the second group of user equipments 124-126, based on the estimated throughput gain.

For example, the IA gain value may correspond to the absolute throughput gain of a user equipment i may be estimated directly from the Shannon capacity formula according to Eq. 4:

$$(G_{abs})_i = (R_{imp})_i - (R_{ref})_i = \log_2(1 + \text{comp\_geometry}_i) - \log_2(1 + \text{geometry}_i) \quad (Eq. 4)$$

Alternatively, in another embodiment, the IA gain value may be determined as a ratio between the estimated bitrates from the first and second geometry value, i.e. a relative throughput gain. The relative throughput gain of a user equipment i may be estimated directly from the Shannon capacity formula according to Eq. 5:

$$(G_{rel})_i = \frac{(R_{imp})_i}{(R_{ref})_i} = \frac{\log_2(1 + \text{comp\_geometry}_i)}{\log_2(1 + \text{geometry}_i)} \quad (Eq. 5)$$

which advantageously captures the behaviour that interference mitigation using IA at low geometries yields a much higher relative bitrate gain $G_{rel}$ than interference mitigation using IA at high geometries.

Thus, it should be noted that the IA gain value may be determined by the network node 101 as a ratio based on the first and second geometry values or as a difference based on the first and second geometry values.

In some embodiments, the orthogonal radio transmission resources, for which the network node 101 schedules the first and second group of user equipments, may be different Transmit Time Intervals, TTIs, or different radio resource blocks in an Orthogonal Frequency Division Multiplexing, OFDM, time-frequency grid.

Action 203

In this action, the network node 101 enables IA of transmissions to the scheduled first group of user equipments from at least two network nodes capable of performing IA of transmissions. For example, the network node 101 may indicate to other network nodes, e.g. the network nodes 102-103, for which group of user equipments IA of transmission should be performed, e.g. the first group 131 of user equipments 121-123.

In some embodiments, in case a centralized network node performs the method, the centralized network node may indicate to the network nodes, e.g. the network nodes 101-103, for which group of user equipments IA of transmission should be performed, e.g. the first group 131 of user equipments 121-12; that is, distribute scheduling decisions to the network nodes. In some embodiments, the network node 101 may further perform IA of transmissions to the scheduled first group of user equipments. Here, the network node 101 is one of the network nodes that actually perform IA of transmissions to the user equipments.

In some embodiments, the at least two network nodes capable of performing IA of transmissions, e.g. the network nodes 101-103, are configured for Co-ordinated Multi-Point, CoMP, transmissions to the user equipments, e.g. the user equipments 121-126.

Figure 3:
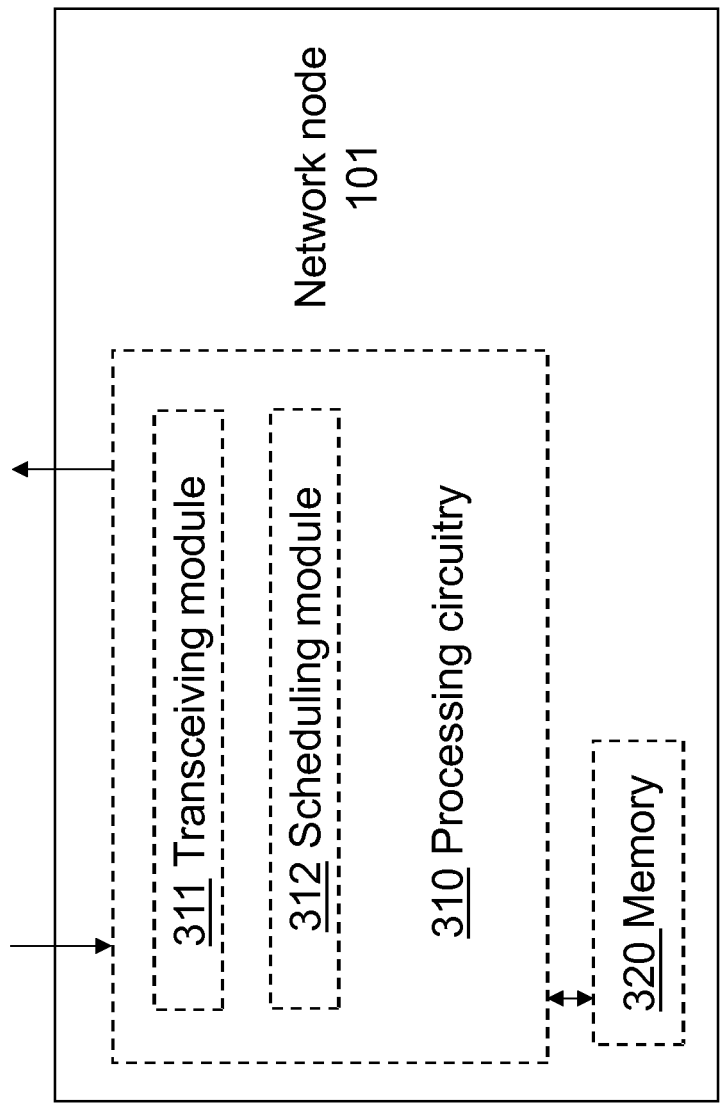
FIG. 3 is a block diagram depicting embodiments of a network node.

To perform the method actions in a network node 101 for enabling Interference Alignment, IA, of transmissions to user equipments 121-126, the network node 101 may comprise the following arrangement depicted in FIG. 3. The network node 101 and the user equipments 121-126 are configured to be in a wireless communications network, such as, e.g. the wireless communications network 100 in FIG. 1.

FIG. 3 shows a schematic block diagram of embodiments of the network node 101. In some embodiments, the network node 101 may comprise a transceiving module 311 and a scheduling module 312. In some embodiments, the network node 101 may comprise a processing circuitry 310, which may also be referred to as processing module or processor. The processing circuitry 310 may comprise one or more of the transceiving module 311 and the scheduling module 312, and/or perform the function thereof described below.

The network node 101 is configured to, or comprises the transceiving module 311 being configured to, receive signal strength values associated with more than one network node 101-107 for the user equipments 121-126, wherein each signal strength value is associated with one network node. Also, the network node 101 is configured to, or comprises the scheduling module 312 being configured to, schedule a first group 131 of the user equipments 121-126 on radio transmission resources that are orthogonal to radio transmission resources of at least one other group of the user equipments 121-126 when an IA gain value for each user equipment in the first group 131 passes a threshold level, which IA gain value is determined based on the received signal strength values. Furthermore, the network node 101 is configured to, or comprises the transceiving module 311 being configured to, enable IA of transmissions to the scheduled first group 131 of user equipments from at least two network nodes 101-103 capable of performing IA of transmissions.

In some embodiments, the network node 101 or scheduling module 312 may be configured to determine the IA gain value for each user equipment 121-126 based on a first geometry value determined based on the received signal strength values for a user equipment that is associated with network nodes 102-107 which are both capable and not capable of performing IA of transmissions together with the network node 101, and a second geometry value determined based on the received signal strength values for a user equipment that is associated with network nodes 104-107 which are not capable of performing IA of transmissions together with the network node 101. In this case, in some embodiments, the second geometry value is further based on an interference leakage factor, $\alpha$, and received signal strength values for the user equipment that is associated with network nodes 102-103 which are capable of performing IA of transmissions together with the network node 101.

In some embodiments, the network node 101 or the scheduling module 312 may be configured to determine the IA gain value for each user equipment 121-126 based on a first SINR value determined based on the received signal strength values for a user equipment that is associated with network nodes 102-107 which are both capable and not capable of performing IA of transmissions together with the network node 101, and a second SINR value determined based on the received signal strength values for a user equipment that is associated with network nodes 104-107 which are not capable of performing IA of transmissions together with the network node 101. In this case, in some embodiments, the second SINR value is further based on an interference leakage factor, $\alpha$, and received signal strength values for the user equipment that is associated with network nodes 102-103 which are capable of performing IA of transmissions together with the network node 101.

In some embodiments, the network node 101 or the scheduling module 312 may be configured to determine the IA gain value for each user equipment (121-126) further based on estimated bit rate values. Here, a first bit rate value may be estimated using the first geometry or SINR value and a second estimated bit rate value may be estimated using the second geometry or SINR value. In this case, in some embodiments, the network node 101 or the scheduling module 312 may be configured to determine the IA gain value for each user equipment 121-126 by estimating a throughput gain using the first and second estimated bit rate values.

In some embodiments, the orthogonal radio transmission resources may be different TTIs or different radio resource blocks in a OFDM time-frequency grid.

In some embodiments, the network node 101 or the transceiving module 311 may be further be configured to perform IA of transmissions to the scheduled first group 131 of user equipments 121-123. In some embodiments, the at least two network nodes 101-103 capable of performing IA of transmissions may be configured for CoMP transmissions to the user equipments 121-126.

In some embodiments, the received signal strength values are RSRP values measured and reported to the network node 101 from the user equipments 121-126. This may in some cases be performed via the network nodes 102-103. In some embodiments, the received signal strength values are measured on SRS transmissions from the user equipments 121-126 by at least one network node 101-103 capable of performing IA of transmissions.

The embodiments for enabling Interference Alignment, IA, of transmissions to user equipments 121-126 may be implemented through one or more processors, such as, e.g. the processing circuitry 310 in the network node 101 depicted in FIG. 3, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 310 in the network node 101. The computer program code may e.g. be provided as pure program code in the network node 101 or on a server and downloaded to the network node 101. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

Thus, the network node 101 may further comprise a memory 320, which may be referred to or comprise one or more memory modules or units. The memory 320 may be arranged to be used to store executable instructions and data, such as, e.g. D2D assistance information, to perform the methods described herein when being executed in the network node 101. Those skilled in the art will also appreciate that the processing circuitry 310 and the memory 320 described above may refer to a combination of analog and digital circuits, and/or one or more processors configured with software and/or firmware, e.g. stored in the memory 320, that when executed by the one or more processors such as the processing circuitry 310 perform the method as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program, comprising instructions which, when executed on at least one processor, e.g. the processing circuitry or module 310, cause the at least one processor to carry out the method for enabling Interference Alignment, IA, of transmissions to user equipments 121-126. Also, some embodiments may comprise a carrier containing the computer program, wherein the carrier is one of an electronic signal, optical signal, radio signal, or computer readable storage medium.

The terminology used in the detailed description of the particular exemplary embodiments illustrated in the accompanying drawings is not intended to be limiting of the described methods, the network nodes 101, 102, 103 or the first user equipment 121, which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

The invention claimed is:

1. A method performed by a network node for enabling Interference Alignment (IA) of transmissions to user equipments, wherein the network node and the user equipments are configured to be in a wireless telecommunications network, the method comprising:
receiving signal strength values associated with more than one network node for the user equipments, wherein each signal strength value is associated with one network node;
scheduling a first group of the user equipments on radio transmission resources that are orthogonal to radio transmission resources of at least one other group of the user equipments when an IA gain value for each user equipment in the first group passes a threshold level, which IA gain value is determined based on:
a first geometry value or first Signal to Interference plus Noise Ratio (SINR) value based on the received signal strength values for a user equipment that is associated with network nodes which are both capable and not capable of performing IA of transmissions together with the network node, and
a second geometry value or second SINR value based on the received signal strength values for a user equipment that is associated with network nodes which are not capable of performing IA of transmissions together with the network node; and
enabling IA of transmissions to the scheduled first group of user equipments from at least two network nodes capable of performing IA of transmissions.

2. The method according to claim 1, wherein the enabling further comprises performing IA of transmissions to the scheduled first group of user equipments.

3. The method according to claim 1, wherein the second geometry value is further based on an interference leakage factor ($\alpha$) and received signal strength values for the user equipment that is associated with network nodes which are capable of performing IA of transmissions together with the network node.

4. The method according to claim 1, wherein the IA gain value for each user equipment is further determined based on estimated bit rate values, wherein a first bit rate value is estimated using the first geometry or SINR value and a second bit rate value is estimated using the second geometry or SINR value.

5. The method according to claim 4, wherein the IA gain value for each user equipment is determined by estimating a throughput gain using the first and second estimated bit rate values.

6. The method according to claim 1, wherein the received signal strength values are Reference Signal Received Power (RSRP), values measured and reported to the network node from the user equipments.

7. The method according to claim 1, wherein the received signal strength values are measured on Sounding Reference Signal (SRS) transmissions from the user equipments by at least one network node capable of performing IA of transmissions.

8. The method according to claim 1, wherein the orthogonal radio transmission resources are different Transmit Time Intervals (TTIs) or different radio resource blocks in an Orthogonal Frequency Division Multiplexing (OFDM) time-frequency grid.

9. The method according to claim 1, wherein the at least two network nodes capable of performing IA of transmissions are configured for Co-ordinated Multi-Point (CoMP) transmissions to the user equipments.

10. A network node for enabling Interference Alignment (IA) of transmissions to user equipments, wherein the network node and the user equipments are configured to be in a wireless telecommunications network, wherein the network node comprises:
- a processing circuitry; and
- a memory containing instructions executable by the processing circuitry whereby the network node is operative to:
  - receive signal strength values associated with more than one network node for the user equipments, wherein each signal strength value is associated with one network node,
  - schedule a first group of the user equipments on radio transmission resources that are orthogonal to radio transmission resources of at least one other group of the user equipments when an IA gain value for each user equipment in the first group passes a threshold level, which IA gain value is determined based on
    - a first geometry value or first Signal to Interference plus Noise Ratio (SINR) value based on received signal strength values for a user equipment that is associated with network nodes which are both capable and not capable of performing IA of transmissions together with the network node, and
    - a second geometry value or second SINR value based on received signal strength values for a user equipment that is associated with network nodes which are not capable of performing IA of transmissions together with the network node; and
  - enable IA of transmissions to the scheduled first group of user equipments from at least two network nodes capable of performing IA of transmissions.

11. The network node according to claim 10, further configured to perform IA of transmissions to the scheduled first group of user equipments.

12. The network node according to claim 10, wherein the second geometry value is further based on an interference leakage factor ($\alpha$) and received signal strength values for the user equipment that is associated with network nodes which are capable of performing IA of transmissions together with the network node.

13. The network node according to claim 10, wherein the IA gain value for each user equipment is further determined based on estimated bit rate values, wherein a first bit rate value is estimated using the first geometry or SINR value and a second estimated bit rate value is estimated using the second geometry or SINR value.

14. The network node according to claim 13, further configured to determine the IA gain value for each user equipment by estimating a throughput gain using the first and second estimated bit rate values.

15. The network node according to claim 10, wherein the received signal strength values are Reference Signal Received Power (RSRP), values measured and reported to the network node from the user equipments.

16. The network node according to claim 10, wherein the received signal strength values are measured on Sounding Reference Signal (SRS) transmissions from the user equipments by at least one network node capable of performing IA of transmissions.

17. The network node according to claim 10, wherein the orthogonal radio transmission resources are different Transmit Time Intervals (TTIs) or different radio resource blocks in an Orthogonal Frequency Division Multiplexing (OFDM) time-frequency grid.

* * * * *